April 12, 1932. H. PARKER 1,853,698
METHOD OF AND MEANS FOR COUPLING FIBER CONDUITS
Filed Aug. 19, 1927
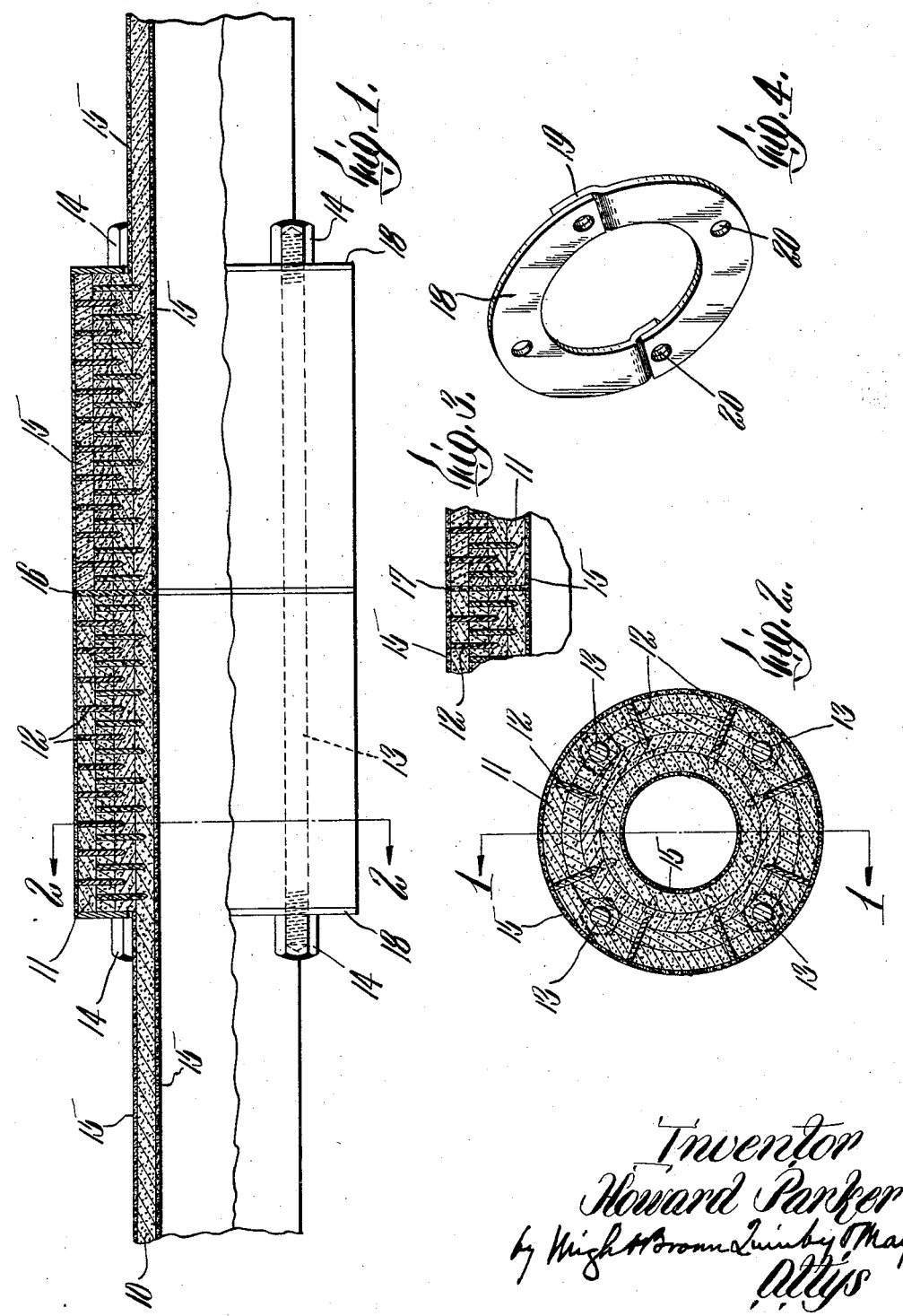
Inventor
Howard Parker Patented Apr. 12, 1932

1,853,698

UNITED STATES PATENT OFFICE

HOWARD PARKER, OF BERLIN, NEW HAMPSHIRE, ASSIGNOR TO BROWN COMPANY, OF BERLIN, NEW HAMPSHIRE, A CORPORATION OF MAINE

METHOD OF AND MEANS FOR COUPLING FIBER CONDUITS

Application filed August 19, 1927. Serial No. 214,067.

This invention relates to the coupling together of sections of fiber tubing or conduit in end-to-end relationship, the coupling being made in such a way as to provide a relatively strong, stiff joint. It is an object of the invention to provide a coupling which will have a minimum of weight and bulk consistent with requisite strength and stiffness, which will be simple and inexpensive, which will be easy to manipulate, which will be highly resistant to corrosive action of acids or other substances in which the coupling may be submerged, and which will have electric insulating properties not inferior to those of the conduit itself.

While not necessarily limited to any particular kind of fiber conduit, my invention relates especially to conduit made of paper pulp which is formed into a wet sheet and rolled up under pressure so that the fibers are compacted and closely interfelted. When the tube is dried, the thorough interfelting results in a conduit having walls of relatively great strength and stiffness. The conduit may then be impregnated with pitch, asphalt or other equivalent or suitable compounds. This treatment hardens the walls of the conduit and renders them water-resistant. The impregnated conduit may also be coated with gilsonite, "blown" asphalt or other suitable material to make it thoroughly waterproof. The resulting product is relatively light, strong, and inexpensive, and is suitable for many industrial uses. Owing to its electric insulating qualities, it is useful also as power cable conduit. It is obvious that for handling and shipping, such tubing must be made in sections of limited length, while in use the tubing must usually extend in a continuous length for considerable distances. It thus becomes necessary to join or couple sections together in end-to-end relation. Owing to the peculiar characteristics of the material, it has been difficult to devise a coupling of reasonable size, weight and simplicity which would make a strong water-tight joint without diminishing the electric insulating properties of the conduit. By my invention, a suitable coupling is provided having these desired characteristics and furthermore being resistant to corrosion.

For a more complete understanding of the invention, reference may be had to the disclosure thereof in the following description and on the drawings, of which,—

Figure 1 is an elevation, partly in section, of a coupling embodying my invention.

Figure 2 is a transverse section on the line 2—2 of Figure 1.

Figure 3 is a fragmentary section showing a slightly modified joint.

Figure 4 is a ring element which may be used with the coupling.

Referring to the drawings in detail, 10 represents a section of fiber conduit of any desired kind. On the end portions of each section a flange or collar of substantial length may be formed, as for example, by tightly fitting thereover short sections 11 of similar conduit of larger diameters. One or more of such short sections may be concentrically arranged upon one another until the desired thickness of flange or collar is built up. In Figure 1, three sections 11 are shown on the end portion of each conduit section 10 forming a flange or collar having a substantial thickness and a length almost twice the diameter of the conduit section 10, but more or less sections 11 may be secured to the end portion of the conduit and to each other by any desired means. As shown, a plurality of radially extending pegs 12 or similar fastening elements may be used, such pegs being preferably of wood or other fibrous material and being embedded in the sections 10 and 11 in such a way as to anchor them together into a unitary flange. It is usually desirable to waterproof fiber conduit in order to make it resistant to the deteriorating action of moisture and to make it useful as piping for fluids. To this end, the sections 10 and 11 may be impregnated with water-resistant saturant of any desired or convenient kind, such as low-melting point asphalt, pitch, resin or other equivalent, which can be rendered relatively fluid at temperatures sufficiently low to avoid injury to the fibrous material of which the conduit is made. The saturant may also be a fluid solution of the above or equivalent waterproofing materials, the solvent being of such a nature as to be removable after the fibrous body has been saturated. I prefer, however, to assemble and fix the flange or collar on the end of the conduit section before the material is treated in saturant. After the short sections 11 have been secured in place with the pegs 12, the whole structure including the conduit 10, the flange and the pegs 12 may then be saturated together, this treatment serving to cement the separate parts together and thus to lend additional strength to the built-up structure. The flanges are provided with longitudinally extending perforations or bores of a size to receive suitable bolts 13 in closely fitting engagement. These bores are preferably arranged symmetrically about the axis of the conduit so that when two end portions are placed in abutting end-to-end relation as shown in Figure 1, the bores through the abutting flanges may be brought into registry so that the bolts 13 can be passed through both the abutting flanges. The bolts are preferably of a length to extend beyond the remote faces of the flanges when inserted therein, the projecting ends of the bolts being preferably threaded to receive suitable nuts 14. As shown, I may provide cap nuts of a non-corroding alloy so as to protect the bolts from corrosion by moisture or acids which may be present under some conditions of use. In order to add further protection to the conduit sections and flanges, I may coat all the free surfaces thereof, within and without, with a suitable waterproofing or acid-resisting material such as for example gilsonite, such coating being indicated as 15. In coupling together the ends of two sections of conduit, I may insert a gasket 16 of rubber or other suitable packing material between the abutting end faces of the flanges. Instead of a gasket 16, however, I may apply a layer 17 of gilsonite, cement, or other plastic packing material suitable for the purpose. After bringing the ends of the conduit sections together with the flange bores in registry, bolts 13 are inserted in the bores and cap nuts 14 are screwed on the ends of the bolts. In order to protect the remote end faces of the flanges from the nuts 14 and to provide a better bearing surface for the nuts, I may place on the outer end faces of the flanges suitable rings to act as washers for the nuts 14. Such rings may be of any desired form or material. As illustrated in Figure 4, I may use a split metal ring 18 comprising two or more parts, an end of each part being offset as at 19 so as to provide a plane face for the ring to bear against the end face of the flange. The ring is perforated as at 20, these perforations being arranged to register with the bores extending through the flange. The rings 18 may be of any hard material, preferably a material which is non-corroding. I have thus provided a coupling for sections of fiber conduit which is extremely simple and easy to manufacture, but which is also substantial, strong and efficient. The substantial length of the flanges or collars, which is considerably more than the diameter of the conduit in the coupling illustrated in Figure 1, and the corresponding length of the bolts 13 which are preferably embedded snugly in the material of the collars, provide a structure whereby the stiffness of the bolts is utilized to stiffen the joint as a whole after the manner of splints. By utilizing cap nuts of non-corroding material, the coupling is easily made proof against being attacked by water or acids such as are found in mines or factories where the conduit may be used. The coupling hereinbefore described provides an effective solution of the problem of how successfully to join together sections of conduit into a continuous line in a practical, efficient and economical manner.

Having thus described certain embodiments of this invention, it should be evident to those skilled in the art that various changes and modifications may be made therein without departing from its spirit or scope as defined by the appended claims.

I claim:—

1. A coupling for fiber conduit comprising, in combination with a pair of sections of fiber conduit in abutting end-to-end relation, a fiber collar of substantial length secured on each of the abutting end portions, said collars each having an end face flush with the end of its conduit section, means for securing said collars to said end portions comprising radially extending fiber fastening elements embedded in the conduits and collars, water-resistant material permeating said fibrous conduit, collars, and fastening elements, a ring of packing material between the opposed faces of said collars and conduit sections, a plurality of bolts embedded in said collars and extending therethrough to the mutually remote ends thereof parallel to the axis of the collars, nuts on the ends of said bolts, and a coating of waterproof material covering the free surfaces of said sections and collars.

2. As a new article of manufacture, a fiber conduit section having a fiber collar of substantial length on an end portion thereof, and means for fastening said collar to said end portion, said fastening means comprising pegs of fibrous material embedded in said collar and end portion, said collar being provided with bores extending from end to end thereof.

In testimony whereof I have affixed my signature.

HOWARD PARKER.